3,809,585
URETHANE PROPELLANT COMPOSITION
Harold L. Greenberg, West Covina, Calif., assignor to the United States of America as represented by the Secretary of the Navy
No Drawing. Filed Nov. 9, 1966, Ser. No. 594,314
Int. Cl. C06d 5/06
U.S. Cl. 149—19.4                                    3 Claims

ABSTRACT OF THE DISCLOSURE

A propellant which comprises an inorganic oxidizer such as ammonium perchlorate, a metal fuel such as aluminum, and an improved urethane binder formed by the condensation of polytetramethylene ether glycol with organic diisocyanates or nitrodiisocyanates, crosslinked with polyfunctional hydroxyl compounds and plasticized with phosphate esters, adipate, azelate, and sebacate esters and/or nitroplasticizers.

---

The present invention relates to improved high energy propellant compositions and to the preparation thereof.

In the preparation of composite rocket propellants, the oxidizer, such as ammonium perchlorate, with or without aluminum or other highly combustible materials, is bonded to an elastomeric solid propellant by a urethane rubbery compound. Such propellant grains are often lined or restricted with urethane rubber on the outside or on other surfaces specified by grain design. These urethane binders and elastomers tend to crystallize and embrittle at low temperatures and at elevated temperatures they get soft and weak. Propellants prepared using this type binder are of low specific impulse and require high oxidizer loading. The present invention provides an improved propellant composition which overcomes these difficulties.

It is therefore an object of the present invention to provide an improved propellant grain which will not crystallize or embrittle at temperatures below 0° F., and which have good resistance to thermal aging up to 180° F. for use in rocket motors operational at extreme temperature ranges.

Another object is to provide a propellant composition which has good resistance to high stresses in storage, handling and temperature fluctuations without getting splits or cracks.

Other objects and advantages of the present invention will be apparent as the description proceeds.

In accordance with the present invention a new and improved elastomeric urethane propellant, having excellent low and high temperature mechanical properties, was made. The propellant comprises an inorganic oxidizer such as ammonium perchlorate, a metal fuel such as aluminum and an improved urethane binder formed by the condensation of certain mixtures of polyether glycols (principally polytetramethylene ether glycol) with organic diisocyanates or nitrodiisocyanates, crosslinked with polyfunctional hydroxyl compounds and plasticized with phosphate esters (such as octyl diphenyl phosphate) or adipate, azelate, and sebacate esters and/or nitroplasticizers.

The following examples are given to better illustrate the invention and should not be considered as limiting it.

EXAMPLE I

| Ingredients: | Percent by weight |
|---|---|
| Ammonium perchlorate | 60.0 |
| Aluminum | 15.0 |
| Phenyl-beta-naphthylamine | 0.50 |
| Bis-2,2-dinitropropyl acetal | 12.74 |
| Octyl diphenyl phosphate | 1.96 |
| Polytetramethylene ether glycol | 7.21 |
| Tris(hydroxymethyl)nitromethane | 0.32 |
| 3-nitraza-1,5-pentane diisocyanate | 2.27 |

EXAMPLE II

| Ingredients: | Percent by weight |
|---|---|
| Ammonium perchlorate | 55.00 |
| Aluminum | 20.00 |
| Phenyl-beta-naphthylamine | 0.50 |
| 2,2-dinitropropyl sulfite | 15.00 |
| Octyl diphenyl phosphate | 7.35 |
| Polytetramethylene ether glycol of 1,600-molecular weight | 7.20 |
| Tris(hydroxymethyl nitromethane) | 0.33 |
| 3-nitraza-1,5-pentane diisoyanate | 2.27 |

The improved binders used in the formulations of Examples I and II were prepared by combining the diisocyanate with polytetramethylene ether glycol of molecular weights ranging from 700 to 3,000, preferably 1,000, and the multifunctional hydroxyl compound [(tris-(hydroxymethyl)nitromethane] as a crosslinker. The elastomers were plasticized with phosphate ester, octyl diphenyl phosphate, sold under the trade name "Santicizer-141." Di-n-butyl sebacate and/or nitroplasticizers may also be used. It was found that phosphate esters (such as octyl diphenyl phosphate) adipate, azelate, and sebacate esters (such as di-n-butyl sebacate) are excellent plasticizers for polytetramethylene ether glycol elastomers yielding rubbers of exceptional properties. It was also discovered that a nitrodiisocyanate, such as 3-nitroza-1,5-pentane diisocyanate readily reacts with polytetramethylene ether glycols to yield elastomers with improved physical properties. Such nitroplasticizers as bis-2,2-dinitropropyl acetal, bis-2,2-dinitropropyl formal and 2,2-dinitropropyl sulfite used in conjunction with octyl diphenyl phosphate or di-n-butyl sebacate successfully plasticize polytetramethylene ether glycol elastomers.

The diisocyanates used may be toluene diisocyanate, hexamethylene diisocyanate or a nitrodiisocyanate.

The propellants described in Examples I and II and others prepared in a similar manner consisting of 3-nitraza-1,5-pentane diisocyanate, polytetramethylene glycol, triol, octyl diphenyl phosphate, bis-2,2-dinitropropyl acetal, bis-2,2-dinitropropyl formal, or bis-2,2-dinitropropyl sulfite, aluminum, ammonium perchlorate and an antioxidant exhibit exceptional physical and ballistic properties, and are of higher energy than conventional propellants. Elongation was good at −75 or −60° F. and there was no crystallization or embrittlement at temperatures below 0° F. The temperature drop test, a severe test for embrittlement, consisted of conditioning the binder or propellant at 40° F., 0° F., −40° F., or −60° F. for one week and then for 3 hours at −60° F. where mechanical properties were determined.

Propellants plasticized with a mixture of bis-2,2-dinitropropyl acetal or bis-2,2-dinitropropyl and di-n-butyl sebacate do not have as good low-temperature properties as those plasticized with the mixture discovered and used herein of bis-2,2-dinitropropyl acetal, bis-2,2-dinitropropyl formal, or bis-2,2-dinitropropyl sulfite and octyl diphenyl phosphate.

Materials used in this invention were the diisocyanates, 2,4-toluene diisocyanate and 3-nitraza-1,5-pentane diisocyanate; polytetramethylene ether glycols of 1,000 molecular weight, 1,600 molecular weight and 3,000 molecular weight; plasticizers included triethyl phosphate, trioctyl phosphate, octyl diphenyl phosphate, di-n-butyl sebacate, di-2-ethyl hexyl sebacate, di-2-ethyl hexyl azelate, di-2-ethyl hexyl adipate; nitroplasticizers included bis-2,2-dinitropropyl acetal, bis-2,2-dinitropropyl sulfite, 2,2-dinitropropyl 4-nitrazapentanoate and 4-nitrazapentanonitrile; the polyols were tris-(hydroxymethyl)nitromethane and trimethylol propane. The antioxidant, phenyl-beta-naphthylamine, sold under the trade name "Neozone D" was used.

Obviously many modifications and variations of the present invention are possible in the light of the above teachings. It is therefore to be understood that within the scope of the appended claims the invention may be practiced otherwise than as specifically described.

What is claimed is:

1. An improved urethane propellant composition comprising
ammonium perchlorate;
aluminum; and
a urethane elastomeric binder;
said binder consisting of
an antioxidant selected from the group consisting of phenyl - alpha - naphthylamine, phenyl-beta-naphthylamine and a mixture of phenyl-alpha-naphthylamine and meta-toluylene-diamine;
a polytetramethylene ether glycol ranging from 1,000 to 3,000 molecular weight;
a plasticizer selected from the group consisting of triethyl phosphate, trioctyl phosphate, octyl diphenyl phosphate, di-n-butyl sebacate, di-2-ethyl hexyl sebacate, di-2-ethyl hexyl azelate, di-2-ethyl hexyl adipate, bis-2,2-dinitropropyl acetal, bis-2,2-dinitropropyl formal, bis-2,2-dinitropropyl sulfite, 2,2-dinitropropyl 4-nitrazapentanoate, 4-nitrazapentanonitrile and mixtures thereof;
a polyol selected from the group consisting of tris-(hydroxymethyl)nitromethane and trimethylol propane; and
a curing agent selected from the group of organic diisocyanates consisting of 2,4-toluene diisocyanate and 3-nitraza-1,5-pentane diisocyanate.

2. A method for the preparation of the composition according to claim 1 which comprises
mixing from 55 to 60% of said ammonium perchlorate and from 15 to 20% of said aluminum with from 20 to 30% of said urethane binder;
said binder being prepared by (1) condensing said polytetramethylene glycol with said diisocyanate, (2) crosslinking the resultant product with said glycol, (3) plasticizing the cross-linked product with said plasticizer and (4) adding said antioxidant.

3. An improved propellant composition comprising the following:

| Ingredients: | Percent by weight |
|---|---|
| Ammonium perchlorate | 55–60 |
| Aluminum | 15–20 |
| Phenyl-beta-naphthylamine | 0.50 |
| Octyl diphenyl phosphate | 7.35 |
| Polytetramethylene ether glycol | 7.20 |
| Tris-(hydroxymethyl)nitromethane | 0.33 |
| 3-nitraza-1,5-pentane diisocyanate | 2.27 |

References Cited

UNITED STATES PATENTS

| 3,002,830 | 10/1961 | Barr | 149—19 |
| 3,116,189 | 12/1963 | Fisher | 149—19 |
| 3,157,025 | 11/1964 | Herring | 149—19 |
| 3,350,245 | 10/1967 | Dickinson | 149—19.4 |

BENJAMIN R. PADGETT, Primary Examiner

U.S. Cl. X.R.

149—19.92, 38, 88